United States Patent
Smith et al.

(10) Patent No.: US 11,641,790 B2
(45) Date of Patent: May 9, 2023

(54) METHOD OF PLANNING A PATH FOR A VEHICLE HAVING A WORK TOOL AND A VEHICLE PATH PLANNING SYSTEM

(71) Applicant: DEERE & COMPANY, Moline, IL (US)

(72) Inventors: Benjamin M. Smith, Falls Church, VA (US); Jacob D. Mayer, Waukee, IA (US); Terence D. Pickett, Waukee, IA (US); Noel W. Anderson, Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 195 days.

(21) Appl. No.: 15/975,391

(22) Filed: May 9, 2018

(65) Prior Publication Data

US 2019/0343035 A1  Nov. 14, 2019

(51) Int. Cl.
*A01B 69/04* (2006.01)
*A01B 69/00* (2006.01)
*A01B 79/00* (2006.01)
*B62D 13/00* (2006.01)

(52) U.S. Cl.
CPC .......... *A01B 69/004* (2013.01); *A01B 69/008* (2013.01); *A01B 79/005* (2013.01); *B62D 13/00* (2013.01)

(58) Field of Classification Search
None
See application file for complete search history.

(56) References Cited

U.S. PATENT DOCUMENTS

| | | | |
|---|---|---|---|
| 4,184,551 A | 1/1980 | Orthman | |
| 7,894,951 B2 | 2/2011 | Norris et al. | |
| 10,648,820 B2 | 5/2020 | Anderson | |
| 10,830,751 B2 | 11/2020 | Pickett et al. | |
| 10,912,251 B2 | 2/2021 | Pickett et al. | |
| 11,047,692 B2 | 6/2021 | Anderson | |
| 2006/0178825 A1 | 8/2006 | Eglington et al. | |
| 2012/0296529 A1* | 11/2012 | Peake | A01B 69/008 701/50 |
| 2014/0236431 A1* | 8/2014 | Hendrickson | A01B 69/007 701/50 |
| 2017/0112045 A1 | 4/2017 | Dix et al. | |

(Continued)

FOREIGN PATENT DOCUMENTS

| | | |
|---|---|---|
| DE | 102016111691 A1 | 12/2016 |
| DE | 102016216740 A1 | 3/2017 |

(Continued)

OTHER PUBLICATIONS

Translation of EP2236020 (Year: 2010).*

(Continued)

*Primary Examiner* — Peter D Nolan
*Assistant Examiner* — Michael F Whalen (57) ABSTRACT

In accordance with an example embodiment, a vehicle path planning system and a method for planning a path of a vehicle having a work tool are provided. The method includes determining an actual path through a work area, modifying the actual path with a margin to determine a modified path plan through the work area, and passing the work tool through the work area with the vehicle along the modified path plan.

19 Claims, 6 Drawing Sheets

(56) References Cited

U.S. PATENT DOCUMENTS

| | | | | |
|---|---|---|---|---|
| 2017/0192431 | A1* | 7/2017 | Foster | G05D 1/0217 |
| 2017/0354078 | A1* | 12/2017 | Foster | A01B 69/008 |
| 2017/0354079 | A1* | 12/2017 | Foster | A01B 69/008 |
| 2017/0357262 | A1* | 12/2017 | Dix | G01S 19/13 |
| 2018/0325010 | A1* | 11/2018 | Connell | A01C 5/08 |
| 2018/0325011 | A1* | 11/2018 | Connell | A01B 33/024 |
| 2018/0325019 | A1* | 11/2018 | Connell | A01C 5/062 |
| 2018/0325020 | A1* | 11/2018 | Connell | A01B 79/02 |
| 2018/0325021 | A1* | 11/2018 | Connell | A01C 7/102 |
| 2018/0359904 | A1* | 12/2018 | Foster | A01B 69/008 |
| 2020/0033146 | A1* | 1/2020 | Cash | G01S 19/51 |
| 2020/0097021 | A1* | 3/2020 | Carpenter | B60D 1/06 |
| 2020/0281110 | A1* | 9/2020 | McNichols | G06N 3/126 |
| 2021/0293553 | A1 | 9/2021 | Anderson | |

FOREIGN PATENT DOCUMENTS

| | | |
|---|---|---|
| EP | 0821296 A2 | 1/1998 |
| EP | 2236020 A1 | 10/2010 |
| EP | 3300562 A1 | 4/2018 |

OTHER PUBLICATIONS

European Search Report issued in counterpart European Patent Application No. 19173369.0 dated Oct. 7, 2019 (7 pages).
Scott Shearer and Santosh Pitla, Precision Planting and Crop Thinning, Automation: The Future of Weed Control in Cropping Systems, retrieved from internet https://books.google.com/books?id=yQ7IBAAAQBAJ&printsec=frontcover&source=gbs_ge_summary_r&cad=0#v=onepage&q&f=false, 2 pages, Springer, Dordrecht, Heidelberg, London and New york.
2011 Olin College "teach and playback" path for JD Gator retrieved from https://www.youtube.com/watch?v=KmToNvrdgzc, published on Apr. 23, 2011.
2011 Toro greens mower with Probotic B.V. "teach and playback" retrieved from http://www.probotiq.com/?tag=teach-playback.
John Deere Implements Guidance retrieved from http://www.orthman.com/our-products.aspx?pagename=Product%20Details&itemid=2056&prodid=12238&pagetitle=Implement+Guidance.
John Deere Active Implements Guidance retrieved from https://www.deere.com/en_US/products/equipment/ag_management_solutions/guidance/active_implement_guidance/active_implement_guidance.page#viewTabs.
John Deere Guidance Systems retrieved from https://www.deere.com/common/docs/products/equipment/agricultural_management_solutions/guidance_systems/brochure/en_GB_yy1114823_e.pdf.
Automated Harvesting retrieved from http://www.expo21xx.com/automation21xx/14891_st3_university/default.htm.

* cited by examiner

METHOD OF PLANNING A PATH FOR A VEHICLE HAVING A WORK TOOL AND A VEHICLE PATH PLANNING SYSTEM

BACKGROUND

Current Global Navigation Satellite System (GNSS) guidance systems use an intended path for a vehicle which may pull or otherwise be connected to a work tool, such as an implement to name a non-limiting example. Although guidance systems are capable of monitoring the position of the vehicle and/or work tool relative to the intended position, any errors of travel through a work area, i.e., differences between the intended path and the path actually traveled by the vehicle and/or work tool, are not recorded. Subsequent passes through the work area follow the initial intended path and ignore the errors or inaccuracies from the actual path of a previous pass. Many agricultural and other work vehicles are utilized to precisely place seed, nutrients, or other materials or precisely cut, harvest, and/or perform another task in a work area along a planned path. Such errors or inaccuracies of the actual path affect the desired precision involved with such tasks.

Therefore, there exists a need in the art for a method of planning a path for a vehicle having a work tool and a vehicle path planning system that improve the precision of travel and tasks performed by the vehicle and/or the work tool.

SUMMARY

Various aspects of examples of the present disclosure are set out in the claims.

According to a first aspect of the present disclosure, a method for planning a path of a vehicle having a work tool is provided. The method includes determining an actual path through a work area, modifying the actual path with a margin to determine a modified path plan through the work area, and passing the work tool through the work area with the vehicle along the modified path plan.

According to a second aspect of the present disclosure, a vehicle path planning system is provided. The system includes a work tool, a vehicle configured to pass the work tool through a work area along a modified path plan based on an actual path of a previous path plan work tool through the work area along a previous path plan, and a controller configured to determine the actual path of the previous path plan work tool, determine an unmodified path plan through the work area based on at least the actual path of the previous path plan work tool, and modify the unmodified path plan with a margin to determine the modified path plan through the work area.

According to a third aspect of the present disclosure, a vehicle path planning system is provided. The system includes a work tool, a vehicle configured to pass the work tool through a work area, a location-determining receiver configured to determine location data of at least one of the vehicle and the work tool, an actual path map comprising location data of at least one of a previous path plan vehicle and a previous path plan work tool generated from the previous path plan vehicle passing the previous path plan work tool through the work area, a modified path plan map comprising a modified path plan based at least partially on the actual path map and a margin, and a processor configured to determine the modified path plan based at least partially on the actual path map and the margin.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

At least one example embodiment of the subject matter of this disclosure is understood by referring to FIGS. 1 through 6 of the drawings.

Figure 1:
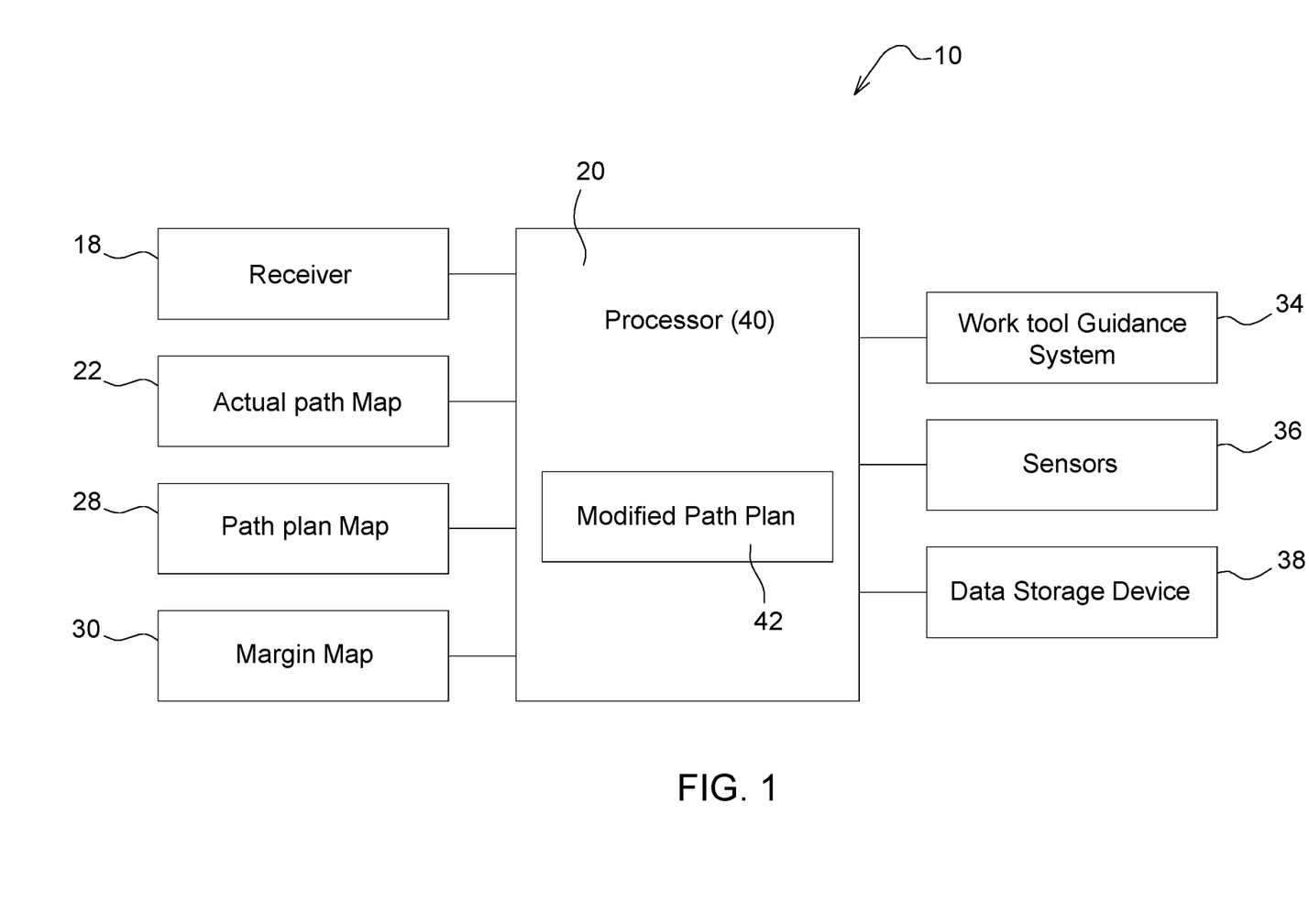
FIG. 1 illustrates a schematic of a vehicle path planning system in accordance with an embodiment of the present disclosure.
Figure 2:
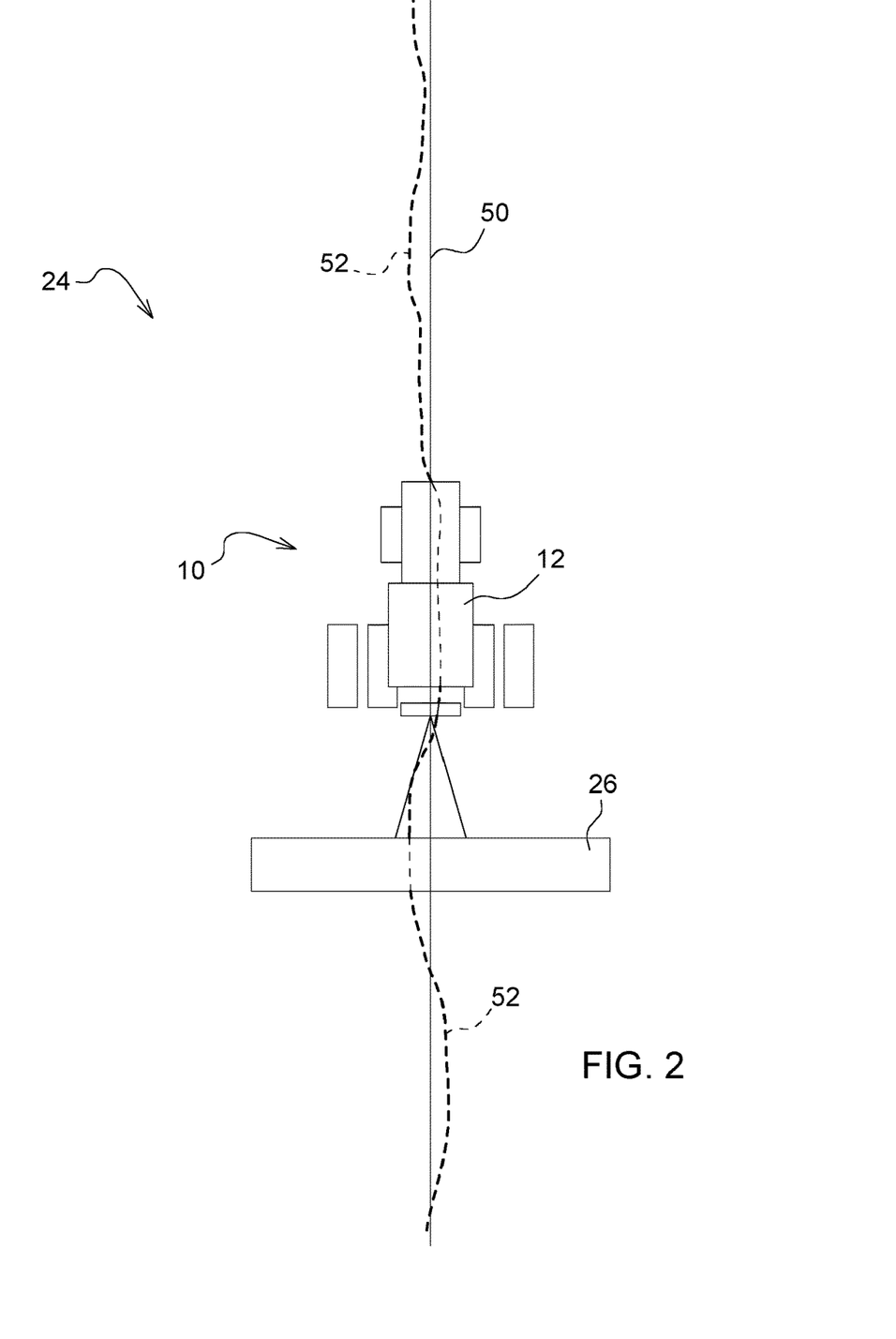
FIG. 2 is a plan view of one or more paths of a vehicle path planning system in accordance with an embodiment of the present disclosure.
Figure 3:
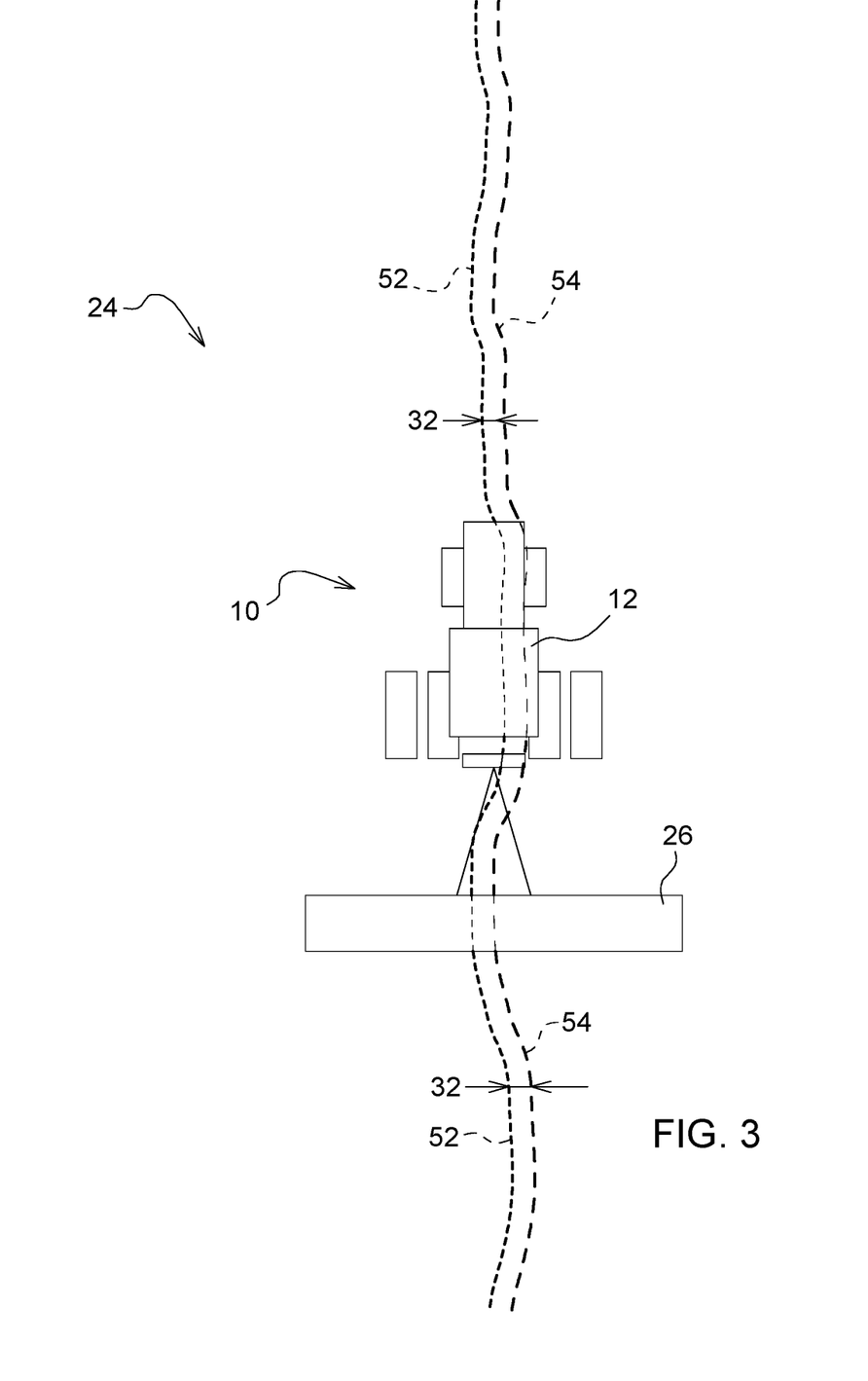
FIG. 3 is a plan view of one or more paths of a vehicle path planning system in accordance with an embodiment of the present disclosure.

Reference is now made to FIGS. 1-3 of the present disclosure, which illustrates a system 10 for planning the path of a vehicle 12. The system 10 of FIG. 1 includes one or more location-determining receiver(s) 18 in communication with a controller 20. The system 10 further includes an actual path map 22 configured to determine, track, and/or store where the vehicle 12 and/or an implement or other work tool 26 has traveled in a work area 24 based on location data of the work tool 26 generated from the vehicle 12 passing the work tool 26 through the work area 24. The vehicle 12 in the illustrated embodiments herein includes a tractor, while the work tool 26 in the illustrated embodiments is an agricultural implement being pulled by the tractor. In one embodiment, the work tool 26, such as an agricultural implement in the non-limiting example, is configured to rotate or pivot relative to the vehicle 12, such as a tractor in the non-limiting example, at a hitch point. In a further embodiment, the implement or other work tool 26 is rigidly attached to the tractor or other vehicle 12, such as with a three-point hitch in a non-limiting example. In one or more additional embodiments, the vehicle 12 is a combine harvester, a self-propelled agricultural vehicle, construction or heavy equipment vehicle, or any other type of vehicle, and the work tool 26 is a cutting, harvesting, spraying, applying, and/or any other type of implement or equipment, such as construction or work equipment, capable of performing a task in the work area 24. In a further embodiment, the vehicle 12 and the work tool 26 are combined as a single vehicle or piece of equipment. The actual path map 22 may determine, track, and/or store one or multiple paths or passes taken by the vehicle 12 and/or the work tool 26 in the work area 24. In one or more embodiments, the actual path map 22 of the system 10 records, determines, calculates, and/or stores the actual path of the work tool 26.

The system 10 further includes a path plan map 28 configured to determine, establish, and/or store one or more path plans of the vehicle 12 and/or the work tool 26. The system 10 further includes a margin map 30 configured to determine, establish, and/or store a margin 32 or margins for application with one or more path plans of the vehicle 12 and/or the work tool 26 in the work area 24. The path plan(s) described in one or more embodiments herein refers to one or more guidance lines in the work area 24. Such guidance lines may be straight or curved in particular embodiments and may be connected or disconnected in particular embodiments.

One or more of the path plan(s) described in the various embodiments herein may be created, modified, and/or stored on-board the vehicle 12 or other vehicle or work tool in the work area 24 or off-board, such as at a location where other relevant information is processed, stored, or otherwise accessed, such as in management map layers including soil fertility level, nutrient need, crop type, and/or other information layers, to name non-limiting examples.

The system 10 further includes a work tool guidance system 34 in the illustrated embodiment of the present disclosure. The work tool guidance system 34 includes the receiver 18 and/or a separate receiver (not shown) to determine the location of the work tool 26 in the work area 24. The work tool guidance system 34 cooperates with a receiver, in an embodiment, and/or another component of the system 10, in another embodiment, to guide the work tool 26, such as an implement pulled by a tractor in one non-limiting example, along a planned or predetermined path. The system 10 of an embodiment not shown does not include the work tool guidance system 34. The system 10 and/or the work tool guidance system 34 may communicate with a steering system and/or a propulsion system of the vehicle 12 in particular embodiments.

The system 10 further includes one or more sensor(s) 36, including various types of in situ sensors as non-limiting examples, connected or in communication with the system 10. The margin 32 is based at least partially on one or more in situ environmental factors in one or more embodiments. The sensor(s) 36 of the illustrated embodiment sense such environmental factors or conditions related to one or more of a topology, plant type, plant condition, soil moisture, soil type, and/or soil traction. In the illustrated embodiment, the sensor(s) 36 include one or more topology sensors, plant visual sensors, e.g., cameras, soil moisture sensors, soil type sensors, and/or soil traction sensors to name non-limiting examples. One of ordinary skill in the art will appreciate the variety of sensors or other input devices capable of measuring and/or determining values and being connected to or communicating with the system 10, and such sensors or other input devices form part of one or more embodiments of the present disclosure. The system 10 further includes a data storage device 38 configured to store data. The data storage device 38 is configured to store data relating to one or more a priori environmental factors including, without limitation, a soil type, topography, and plant type. One of ordinary skill in the art will appreciate the various environmental or other factors that may be stored in the device 38 and affect the traveling along a path plan or tasks of the vehicle 12, and the device 38 is configured to store such factors in one or more embodiments of the present disclosure.

As illustrated in FIG. 1, a processor 40 of the controller 20 receives location information from the receiver(s), data from the sensor(s) 36, and/or data from the data storage device 38, as well as receiving data from and/or otherwise accessing or being in communication with the actual path map 22, the path plan map 28, and the margin map 30. However, in any embodiment described herein, one will appreciate that the controller 20 may replace or supplement the processor 40 and vice versa. Further, the processor 40 and/or the controller 20 may differ by type, number, and/or location, such as single or multiple processor(s) or local or remotely located processors to name non-limiting examples, for different passes by the vehicle 12 and/or the work tool 26 through the work area 24 or for different maps, path plans, or other electronic processes of one or more embodiments described herein. The processor 40 determines a modified path plan 42 based at least partially on the actual path map 22 and the margin 32 in one embodiment. In an embodiment, the processor 40 determines a modified path plan map based on the modified path plan 42. In the illustrated embodiments, the processor 40 determines the modified path plan 42 based on any one or more of the data from the sensor(s) 36, the data from the data storage device 38, the actual path map 22, the path plan map 28, and the margin map 30.

In one non-limiting example, the previous actual pass is a seeding pass, and the current pass is a nutrient-application pass. As such, the current path plan might involve placement of nutrient a predetermined distance from the placed seeds (e.g., 4 inches laterally spaced and 4 inches below the seed) with an application and/or site-specific buffer or margin (e.g., 2 cm to compensate for GNSS localization error). In the example, the processor 40 determines the modified path plan 42 based on the actual path map 22, the path plan map 28 (with 4 inch by 4 inch spacing), and the margin map 30 (with error margin).

FIG. 2 illustrates an embodiment of the system 10 whereby the processor 40, the controller 20, and/or another controller of the vehicle 12 guides the vehicle 12 along a path plan 50, represented by the solid line in FIG. 2, of the path plan map 28. The path plan of one or more embodiments includes a predetermined path and/or control algorithm that an operator utilizes to control the movement of vehicle 12 and/or the work tool 26 in the work area 24. During execution of the path plan 50, the vehicle 12 and/or the work tool 26 may deviate from the desired path of the path plan 50, thereby forming an actual path 52, represented by the dashed line in FIG. 2, of the vehicle 12 and/or the work tool 26. Deviation may be caused by conditions relating to the crop, the soil, or one or more other environmental factors, topography, error in GNSS localization or another location-determining limit or error, equipment or vehicle physical limitations and/or response time, and/or any other factor or condition related to the vehicle 12, the work tool 26, the work area 24, and/or a path of the work area 24. One or more components of the system 10 records, determines, calculates, and/or stores the actual path 52 of the vehicle 12 and/or the work tool 26 to form the actual path map 22. The actual path map 22, the path plan map 28, the modified path plan map, and/or the margin map 30, as described herein, may include, in one or more embodiments, a visual representation of the map, a listing or collection of location and/or margin values, and/or any other data format usable by the processor 40 and/or the controller 20. The processor 40 or other component of the system 10 utilizes the actual path 52 and/or the actual path map 22 to create or otherwise determine a path for the vehicle 12 and/or the work tool 26 during one or more subsequent pass(es) through the work area 24.

In one or more further embodiments of the present disclosure, the actual path 52 and the actual path map 22 are not formed by and/or do not represent a pass actually taken by the vehicle 12 and/or the work tool 26. In such embodiments, the actual path 52 is an identified, preferred, or otherwise predetermined path as part of an overall path plan or determined path in a row or other area of the work area 24. In a non-limiting example for illustration purposes, the actual path 52 is determined post-emergence via an image captured by an unmanned aerial vehicle (UAV) or another device capable of determining planting or crop location.

Specifically, with reference to FIG. 3, the system 10 of an embodiment determines an unmodified, previously recorded actual path plan through the work area 24 based on at least the actual path 52 of the vehicle 12 and/or the work tool 26. The system 10 then modifies the actual path plan with the margin 32 to determine the modified path plan 42 through the work area 24. The margin 32 is based, at least partially, on data received by one or more of the in situ sensor(s) 36, one or more a priori environmental factors, a difference between the actual path 52 and the previous path plan 50 or another path plan or previous actual path, error in GNSS localization or another location-determining limit, error, or margin, equipment response time, and/or other sensed, calculated, known, and/or determined data or information related to the vehicle 12, the work tool 26, and/or a path of the work area 24. The controller 20, the processor 40, and/or another component of the system 10 controls the vehicle 12 and/or the work tool 26 along a modified path 54 associated with the modified path plan 42.

The margin 32 and/or the margin map 30 is/are utilized in one or more embodiments to incorporate look-ahead capabilities to anticipate and prepare the vehicle 12 and/or the work tool 26 for changing conditions in the path of the work area 24. In an illustrative embodiment, the actual path 52, the actual path map 22, and/or other data indicate(s) a condition in the work area 24 that may impact travel, such as a slope or other topographical element to name a non-limiting example, and the margin 32 and/or the margin map 30 results in steering and/or other control of the vehicle 12 to compensate for the condition before or as the vehicle 12 traverses the condition location.

In a non-limiting example, particular vehicles, such as sprayers in a non-limiting example, have higher centers of gravity compared to tractors, for example, and operate at higher ground speeds. The look-ahead capabilities and/or information relating to the margin 32 and/or the margin map 30 may be incorporated with location and vehicle roll, pitch, yaw, and other machine form data to predictively and precisely control the position and orientation of the vehicle 12 and/or work tool in the work area 24.

In a further non-limiting example, a towed implement may be especially susceptible to slipping sideways on side slopes. The system 10 may identify an area with sideslip and/or an empirically-generated likelihood and magnitude for a sideslip condition for a given area based on a tractor-implement configuration and a map of the work area 24. Such a sideslip prediction may form the basis for a margin 32, e.g., at location X, slip is likely 3 cm downhill; therefore, the margin 32 is 3 cm uphill.

The margin 32 and/or the margin map 30 includes variable values such that the distance between the actual path 52 and the modified path 54 is variable in an embodiment, or at least different at two or more locations of the work area 24, while the margin 32 and/or the margin map 30 includes a single, constant or fixed value or distance in another embodiment. In particular embodiments not illustrated, the margin map 30 may be combined with the path plan map 28 in a modified path plan map to determine, establish, and/or store one or more path plans of the vehicle 12 and/or the work tool 26 as modified by the margin(s) 32.

Figure 4:
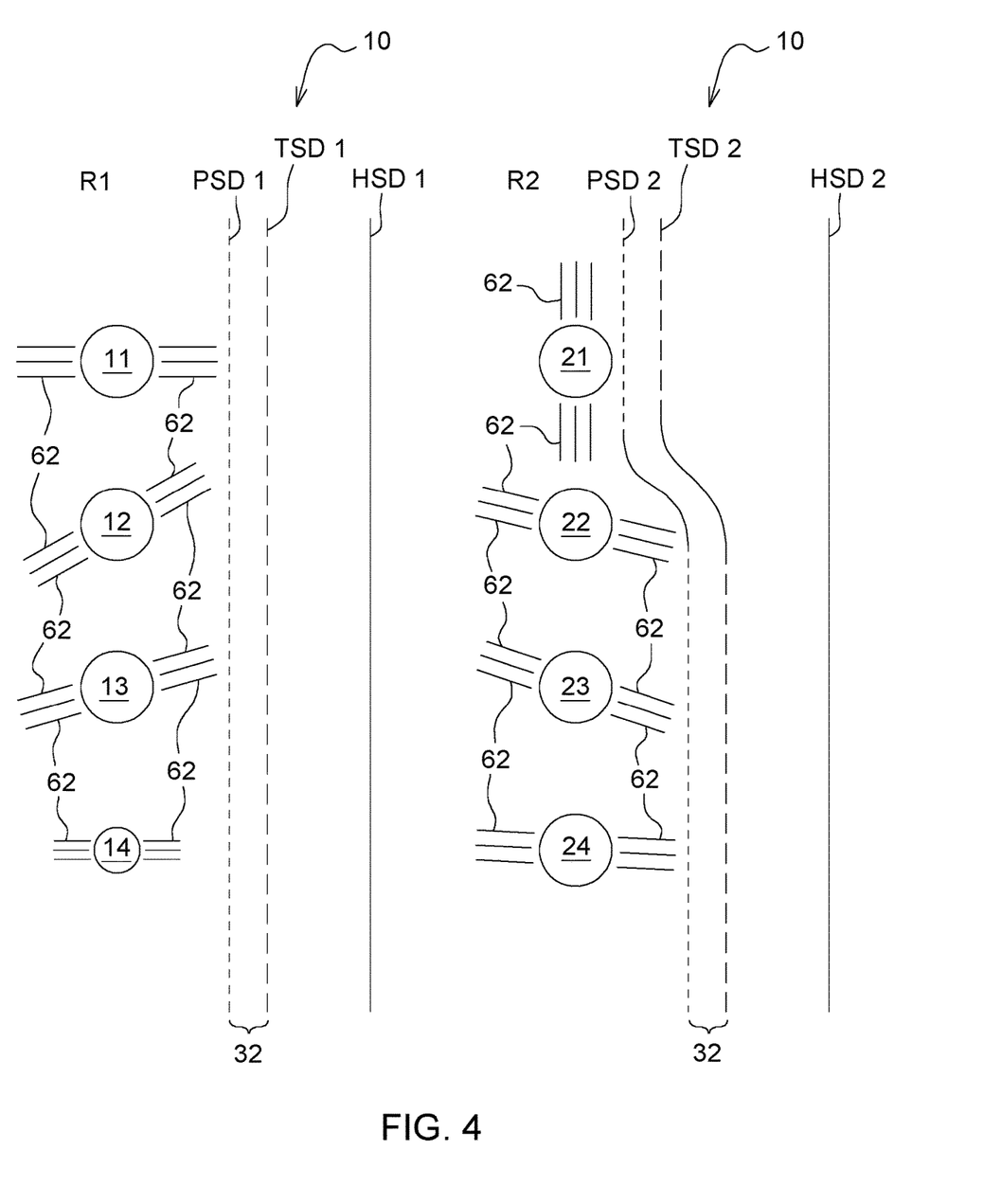
FIG. 4 is a plan view of one or more paths of a vehicle path planning system in accordance with an embodiment of the present disclosure.

FIG. 4 illustrates one embodiment of the system 10 whereby the processor 40 and/or another controller component of the system 10 controls application of nutrients adjacent to a first crop row R1 having individual plants 11-14 and a second crop row R2 having individual plants 21-24. Historic side dress paths HSD1, HSD2 represent the paths of nutrient application disposed generally evenly between crop rows. The historic paths HSD1, HSD2 are configured to minimize damage to the crop by machinery. However, the spacing of the historic paths HSD1, HSD2 from the crop rows may reduce growth from a delay of plant roots in finding nutrients and/or result in nutrient waste. Preferred side dress paths PSD1, PSD2 represent ideal paths of nutrient application as close to roots 62 as possible to minimize waste of nutrients and allow strong crop growth without being too close to the roots to cause damage to the roots or crop. One of ordinary skill in the art will recognize the ability to determine the location of roots of some crops, such as corn, from the location of leaves. Further, root variation may relate to crop variety, such as roots growing deeper or broader relative to leaf development. Even further, some crops have root structures that grow as a function of precipitation since germination. In a non-limiting example, such crops may grow deeper in relatively dry conditions and grow broader in relatively wet conditions. Empirical data from root extent as a function of precipitation may be analyzed to generate a margin 32 or other factor. Such determinations described herein may result in a fixed, multiplied, and/or variable margin 32 from, for example, the tip of the leaves to the edge of the root ball. Such a margin 32 maybe combined with any other margin 32 described herein. The preferred paths PSD1, PSD2 are recorded, actual paths taken by a nutrient-applying work tool or other vehicle or work tool in an embodiment, while the preferred paths PSD1, PSD2 are planned, calculated, or otherwise determined paths not previously taken by a vehicle or work tool in another embodiment.

As illustrated in FIG. 4, a structure, size, and/or orientation of the crop and/or the roots of the crop will affect the paths PSD1, PSD2 in that particular embodiment. Further, in one or more embodiments, one or more actual paths or preferred paths PSD1, PSD2 are based at least partially on root depth, horizontal root span, and/or root density to name non-limiting examples. Similar to any other embodiment described herein, the system 10 of an embodiment modifies the preferred paths PSD1, PSD2, which may or may not be based on an actual path traveled by the vehicle 12 and/or the work tool 26, with the margin 32 to determine target side dress paths TSD1, TSD2. Similar to other embodiments described herein, the margin 32 is based, at least partially, on data received by one or more of the in situ sensor(s) 36, one or more a priori environmental factors, crop root mass, a difference between the actual path 52 and the previous path plan 50 or another path plan or previous actual path, error in GNSS localization or another location-determining limit, error, or margin, equipment response time, and/or other sensed, calculated, known, and/or determined data or information related to the vehicle 12, the work tool 26, and/or a path of the work area 24. In one non-limiting example, the offset or margin 32 is 2 centimeters. In an additional non-limiting example, the offset or margin is between 0.1 and 10 centimeters. The offset or margin 32 is less than 0.1 centimeters in a further embodiment and greater than 10 centimeters in an even further embodiment. As applicable, the margin 32 may also compensate for root mass in an embodiment. In addition to the various factors discussed herein, the margin 32 may vary within a pass based on further factors including, without limitation, leaf orientation, root mass orientation, GNSS error in a previous pass, topography, and/or vehicle or equipment dynamics.

Any embodiment of the system 10 described herein may utilize real time kinematic positioning (RTK) or precision point positioning (PPP) techniques and/or equipment in order to enhance accuracy of any pass or coverage by the vehicle 12 and/or work tool 26. RTK and PPP systems enhance the precision of position data and may utilize reference stations in or near the work area 24 in particular embodiments. The PPP or RTK system may replace or be combined with the margin 32 or other path-modifier described herein in particular embodiments.

Figure 5:
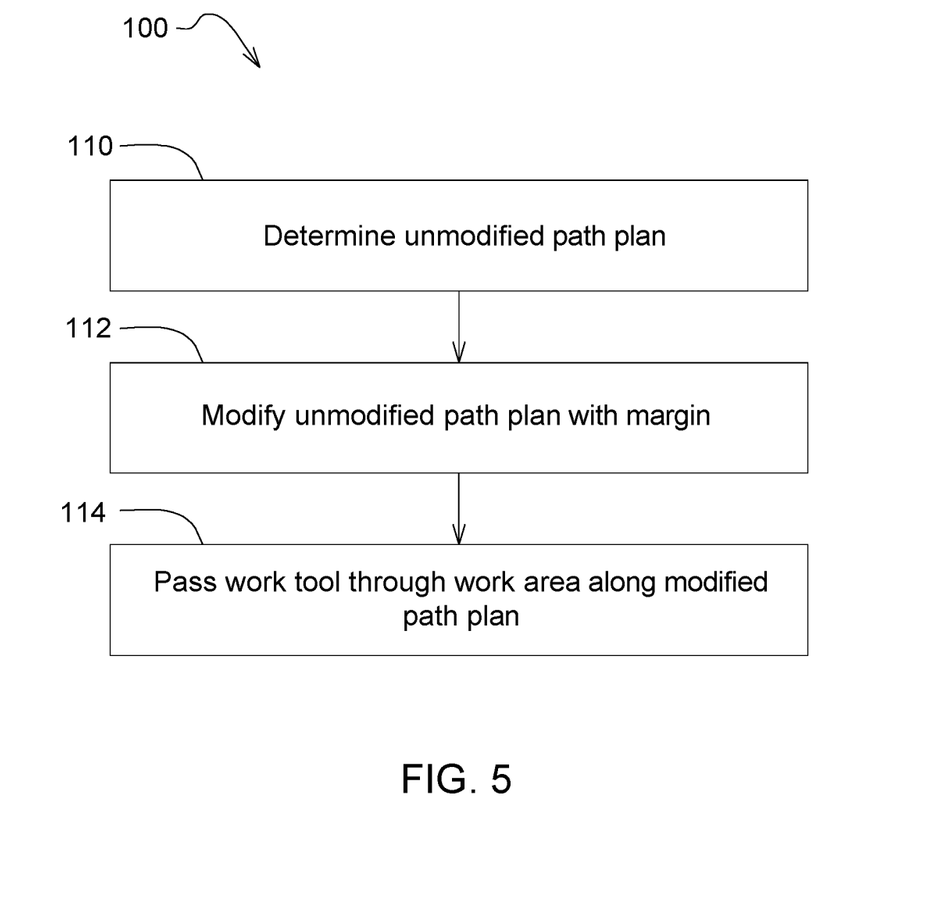
FIG. 5 illustrates a method of planning a path of a vehicle having a work tool in accordance with an embodiment of the present disclosure.

Reference is now made to FIG. 5, which illustrates a method 100 for planning a path of the vehicle 12 having the work tool 26. In any embodiment described herein, the system 10 and/or the method 100 relates to planning, controlling, and/or determining a path of the vehicle 12, the work tool 26, or both. The method 100 includes determining, at step 110, or otherwise accessing, receiving, calculating, creating, and/or storing, the unmodified path plan based on the actual path previously taken by the work tool 26 through the work area 24 with the vehicle 12.

The method 100 further includes modifying, at step 112, the unmodified path plan with the margin 32 to determine the modified path plan through the work area 24. The method 100 further includes passing, at step 114, the work tool 26 through the work area 24 with the vehicle 12 along the modified path plan. In one or more embodiments, the actual path may be taken by a previous path plan work tool that is different than the work tool 26 and/or taken by a previous path plan vehicle that is different from the vehicle 12. In certain embodiments, the vehicle 12 and/or the work tool 26 described as passing through the work area 24 may be different at any one or more times, such as a tractor pulling a planter implement to establish an initial actual path compared to a harvester following a modified path plan later in the season to describe one non-limiting example. However, in further embodiments, any one or more previous path plan work tools or other work tools described herein may be the same work tool, such as a towed agricultural implement or, more specifically, a nutrient application implement to name non-limiting examples. Similarly, previous path plan vehicles or other vehicles described herein may be the same vehicle, such as a tractor in a non-limiting example.

In further embodiments, the system 10 and/or the method 100 includes determining a second actual path from passing the vehicle 12 and/or another vehicle and the work tool 26 and/or another work tool through the work area 24 along any determined modified path plan. The system 10 and/or the method 100 of particular embodiments further includes modifying the second actual path with the margin 32 and/or a second margin to determine a second modified path plan through the work area 24. The second modified path plan, the margin 32 and/or the second margin may be determined in accordance with any embodiment described herein. The system 10 and/or the method 100 of particular embodiments further includes passing a second actual path work tool through the work area 24 with a second actual path vehicle along the second modified path plan. As explained above, the second actual path work tool and/or vehicle may be the same as or different from the work tool 26 and/or the vehicle 12 of any one or more previous passes.

Figure 6:
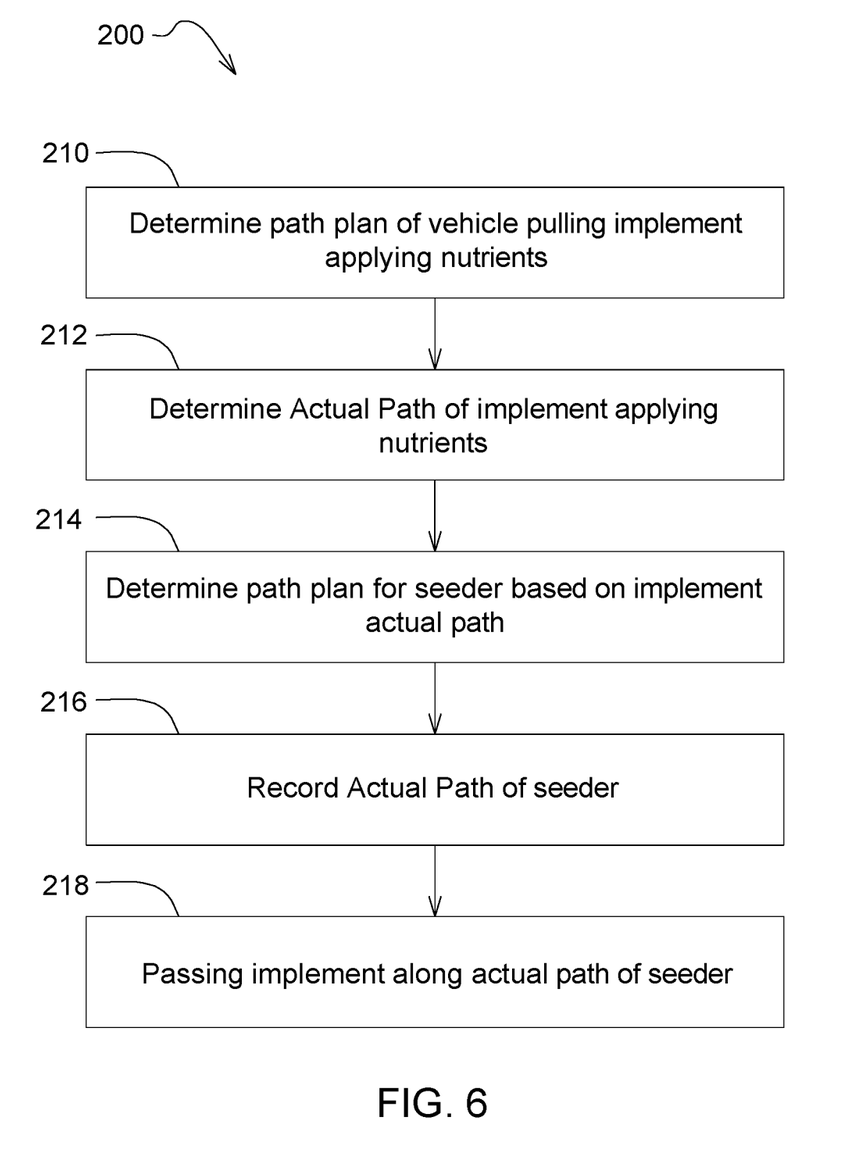
FIG. 6 illustrates a method of planning a path of a vehicle having a work tool in accordance with an embodiment of the present disclosure.

Referring now to FIG. 6, an illustrative embodiment of a method 200 in accordance with the present disclosure is shown. The method 200 includes determining, at step 210, or otherwise accessing, receiving, calculating, creating, and/or storing, the path plan of the vehicle 12 pulling an implement applying nutrients. The method 200 further includes recording, tracking, storing, or otherwise determining, at step 212, the actual path of the implement applying nutrients in the work area 24. The method 200 further includes creating or otherwise determining, at step 214, a path plan for a seeder based at least partially on the actual path of the implement that applied nutrients in step 212. The method 200 further includes recording, tracking, storing, or otherwise determining, at step 216, the actual path of the seeder. The method 200 further includes passing, at step 218, the vehicle 12 and/or an implement along the actual path of the seeder for one or more passes over a predetermined period of time. As one non-limiting example, the actual path of the seeder may be utilized or followed for passes by the vehicle 12, implement, or any other equipment in the work area 24 for the remainder of the season or a number of seasons. In a further non-limiting example, another actual pass, such as by an implement applying a nutrient or another material or another vehicle or work tool traversing the work area 24, may be utilized or followed for one or more remaining passes in the work area 24. The methods 100, 200 and any other method or step described herein may utilize the margin 32 of any one or more embodiments to determine a path to be executed by a vehicle, implement, and/or work tool in the work area 24.

In an illustrative, non-limiting example, a planter being pulled by the vehicle 12 plants seed along a path in the work area 24. The path may or may not be controlled by a predetermined path plan of the vehicle 12. The system 10 records the actual placement of seed in the work area 24. A side dress fertilizer applicator then travels through the work area 24 along the recorded path of the actual placement of seed/plants with or without application of a universal or a side dress fertilizer applicator-specific margin. A sprayer then travels through the work area 24 along the same recorded seeding path, with or without application of a universal or sprayer-specific margin. A high-clearance, late season nitrogen applicator then comes through the work area 24 along the same recorded seeding path, with or without a universal or late season applicator-specific margin. The cropping season ends, and a nutrient application then travels through the work area 24 along the same recorded seeding path, with or without a universal or nutrient applicator-specific margin, at the start of the next cropping season. One will appreciate that, while the seeding path is followed or utilized for subsequent paths in the work area 24 in the above example, any one or more other pass(es) by the vehicle 12 and/or other equipment may be utilized or followed for path planning purposes. Further, any pass may be recorded and stored with or without being utilized later.

In a further embodiment, the vehicle 12, such as a tractor in a non-limiting example, and the work tool 26, such as a nutrient-applying implement in a non-limiting example, are configured, targeted, or otherwise controlled to pass through the work area 24 along different paths. In a non-limiting example, a tractor may be controlled to pass through the work area 24 along an original guidance line or path plan used for the planting operation, such as to reduce or limit soil compaction, while the nutrient-applying implement is controlled to follow the actual path of the planter from the planting operation to achieve desired placement of nutrients based on plant location. In another embodiment, the implement gauge or transport wheels or other component may be controlled to travel on the actual planting path traveled by the tractor or implement, and the nutrient applicator(s), knives, and or other mechanism may be controlled to move laterally and follow along an offset, modified, or otherwise different path plan, such as one having a predetermined offset from the plant stalk in a non-limiting example.

Without in any way limiting the scope, interpretation, or application of the claims appearing below, as will be appreciated by the present embodiments, capturing the actual path of the implement, work tool, or vehicle that is traveling through the work area 24 and, in the illustrated example, applying the seeds or nutrients, rather than simply following an intended path of the implement, work tool, and/or vehicle solves the problem of precisely placing seed and nutrients after, for example, an initial pass. The recorded path of the vehicle, implement, or work tool can be used to create the intended path for the next application pass in the work area. The process of capturing the actual path of the vehicle in the work area may be repeated until a critical, master, or controlling path is complete, such as seeding plants. The actual path of this master operation then used for one, some, or all subsequent passes in the work area, such as pre-emergence chemical application, post-emergence nutrient application, post-emergence chemical application, and/or any other operation in the work area 24. It will be further appreciated that, although an actual path will be determined and utilized for one or more future path plans, GNSS or other location-determining errors will still occur and/or one or more sensed, known, environmental, and/or determined factors may affect precise execution by the vehicle and/or the equipment. Therefore, an appropriate offset and/or margin is applied to subsequent passes to allow precise operation, such as placement of seed or nutrients relative to prior applications of seed or nutrient in a non-limiting example.

Precision guidance for seed and nutrient placement throughout and across growing seasons is a key to application of early nutrients, eliminating unnecessary fertilization, and providing plants consistent access to nutrients across a field. The embodiments of the present disclosure improve agricultural performance at least due to improved placement of seed relative to a recently placed fertilizer band, as well as placement of fertilizer relative to locations of plants, from improved implement guidance precision and consistency, as illustrated in one non-limiting example.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A method for planning a path by a system that controls a vehicle having a work tool, the method comprising:
   determining, prior to determining an actual path, a previous path plan for a previous path plan vehicle and a previous path plan work tool;
   passing the previous path plan vehicle and the previous path plan work tool along the previous path plan through a work area;
   determining the actual path traveled by at least one of the previous path plan vehicle and the previous path plan work tool being guided by the system during execution of the previous path plan by recording a location of at least one of the previous path plan vehicle and the previous path plan work tool through the work area along the previous path plan as the system guides the at least one of the previous path plan vehicle and the previous path plan work tool through the work area along the previous path plan;
   determining at least one factor associated with the location of the at least one of the previous path plan vehicle and the previous path plan work tool and at least one of a structure, size, and orientation of one of a crop and a root of a crop;
   determining a margin based at least partially on the at least one factor;
   modifying the actual path with the margin to determine a modified path plan through the work area, wherein the system that plans the path modifies the actual path with the margin to determine the modified path plan through the work area; and
   passing the work tool through the work area with the vehicle along the modified path plan.

2. The method of claim 1, wherein the margin is based at least partially on at least one in situ environmental factor.

3. The method of claim 2, wherein the at least one in situ environmental factor comprises at least one of a topology, plant type, plant condition, soil moisture, soil type, and soil traction.

4. The method of claim 1, wherein the margin is based at least partially on at least one a priori environmental factor.

5. The method of claim 4, further comprising storing the at least one a priori environmental factor.

6. The method of claim 5, wherein the at least one a priori environmental factor comprises at least one of a soil type, topography, and plant type.

7. The method of claim 1, wherein the actual path is based at least partially on plant root information.

8. The method of claim 1, wherein the margin is based at least partially on a difference between the actual path and the previous path plan.

9. The method of claim 1, further comprising determining a second actual path from passing at least one of the vehicle and the work tool through the work area along the modified path plan.

10. The method of claim 9, further comprising modifying the second actual path with one of the margin and a second margin to determine a second modified path plan through the work area.

11. The method of claim 9, further comprising passing a second actual path work tool through the work area with a second actual path vehicle along the second modified path plan.

12. A vehicle path planning system comprising:
   a work tool;
   a vehicle configured to pass the work tool through a work area along a modified path plan based on an actual path of a previous path plan work tool through the work area along a previous path plan; and
   a controller configured to determine the actual path of the previous path plan work tool guided along the previous path plan during execution of the previous path plan by recording a location of the previous path plan work tool through the work area along the previous path plan, wherein the controller is further configured to determine an unmodified path plan through the work area based on at least the actual path of the previous path plan work tool, wherein the controller is even further configured to determine at least one factor associated with the work area and at least one of a structure, size, and orientation of one of a crop and a root of a crop, wherein the controller is even further configured to determine a margin based at least partially on the at least one factor, and wherein the controller is even further configured to modify the unmodified path plan with the margin to determine the modified path plan through the work area.

13. The system of claim 12, further comprising at least one sensor configured to sense at least one in situ environmental factor, wherein the margin is based at least partially on the at least one in situ environmental factor.

14. The system of claim 13, wherein the at least one in situ environmental factor comprises at least one of a topology, plant type, plant condition, soil moisture, soil type, and soil traction.

15. The system of claim 12, further comprising a data storage device configured to store at least one a priori environmental factor.

16. The system of claim 15, wherein the margin is based at least partially on the at least one a priori environmental factor.

17. The system of claim 16, wherein the at least one a priori environmental factor comprises at least one of a soil type, topography, and plant type.

18. The system of claim 12, wherein the controller is further configured to determine the previous path plan, wherein a previous path plan vehicle is configured to pass the previous path plan work tool through the work area along the previous path plan to establish the actual path of the previous path plan work tool through the work area, and wherein the margin is based at least partially on a difference between the actual path and the previous path plan.

19. A vehicle path planning system comprising:

a work tool;

a vehicle configured to pass the work tool through a work area;

a location-determining receiver configured to determine location data of at least one of the vehicle and the work tool;

an actual path map comprising location data of at least one of a previous path plan vehicle and a previous path plan work tool generated from the previous path plan vehicle passing the previous path plan work tool through the work area along a previous path plan while being guided by the previous path plan vehicle during execution of the previous path plan;

a modified path plan map comprising a modified path plan based at least partially on the actual path map and a margin; and a processor configured to determine the modified path plan based at least partially on the actual path map and the margin;

wherein the processor is further configured to determine at least one factor associated with the work area and at least one of a structure, size, and orientation of one of a crop and a root of a crop, and wherein the processor is even further configured to determine the margin based at least partially on the at least one factor.

* * * * *